United States Patent [19]

Barzuza

[11] Patent Number: 4,643,828
[45] Date of Patent: Feb. 17, 1987

[54] FLUID FILTER SYSTEM AND A SUCTION NOZZLE THEREFOR

[75] Inventor: Ytzhak Barzuza, Petach Tikva, Israel

[73] Assignee: Filtration Water Filters for Agriculture and Industry Ltd., Tel Aviv, Israel

[21] Appl. No.: 733,737

[22] Filed: May 14, 1985

[30] Foreign Application Priority Data

Jun. 4, 1984 [IL] Israel .......................... 71999

[51] Int. Cl.$^4$ ............................................. B01D 29/38
[52] U.S. Cl. ..................... 210/412; 210/411; 210/415; 210/414
[58] Field of Search ............... 210/412, 411, 409, 415, 210/413, 414

[56] References Cited

U.S. PATENT DOCUMENTS

| 1,945,839 | 2/1934 | Maltitz | 210/411 |
| 2,066,479 | 1/1937 | MacIsaac | 210/411 |
| 3,017,029 | 1/1962 | Berninger | 210/411 |
| 3,784,016 | 1/1974 | Akiyama | 210/412 |
| 4,518,501 | 5/1985 | Lennartz et al. | 210/411 |

FOREIGN PATENT DOCUMENTS 52-32175  3/1977  Japan .................................. 210/411

Primary Examiner—Tim Miles
Attorney, Agent, or Firm—Sandler & Greenblum

[57] ABSTRACT

There is provided a fluid filter system cleanable by suction. The system comprises a filter element fixedly attached to a substantially rigid filter-element support mounted in a filter housing and provided with a plurality of openings, at least one suction nozzle having an inlet opening located in close proximity to the filter element and adapted to move with its inlet opening past the filter element in such a way as to cover, in succession, at least some zones of the filter element while producing a suction flow. The invention further comprises guide means for guiding a fluid stream from the high-pressure raw-fluid space of the filter housing to a low-pressure zone created by the suction nozzle between the inlet opening thereof and that portion of the filter-element support which faces the suction nozzle.

9 Claims, 9 Drawing Figures

4,643,828

FLUID FILTER SYSTEM AND A SUCTION NOZZLE THEREFOR

FIELD OF THE INVENTION

The present invention relates to a fluid filter system cleanable by suction. It also relates to suction nozzles usable for such filters.

DISCUSSION OF PRIOR ART

Cleaning of filters by backflushing produced by suction nozzles has long been known and is used in a great variety of filter devices. While such suction nozzles are fairly effective with particulates such as sand, soil clods, pieces of straw and the like, they often fail with certain organic pollutants such as algae and the like, which tend to cling to filters and are not easily pried loose by a simple backflushing flow.

It is an object of the present invention to improve upon the performance of prior-art filter systems using suction nozzles by providing a system in which a secondary flow, induced by the suction flow produced by the nozzle, will loosen also the most stubborn of deposits and facilitate their subsequent removal through the suction nozzle.

This the invention achieves by providing a fluid filter system cleanable by suction, comprising a filter element fixedly attached to a substantially rigid filter element support mounted in a filter housing and provided with a plurality of openings, at least one suction nozzle having an inlet opening located inclose proximity to said filter element and adapted to move with its inlet opening past said filter element in such a way as to cover, in succession, at least some zones of said filter element while producing a suction flow, further comprising guide means for guiding a fluid stream from the high-pressure raw-fluid space of said filter housing to a low-pressure zone created by said suction nozzle between the inlet opening thereof and that portion of the filter element support which faces said suction nozzle.

There is also provided a suction nozzle for a fluid filter system cleanable by suction comprising a filter element fixedly attached to a substantially rigid filter-element support mounted in a filter housing, said suction nozzle having an inlet opening and a tube-like duct located at the inside of said nozzle and attached to a lateral wall thereof, said duct extending between an inlet opening co-planar with said lateral wall, and an outlet opening substantially co-planar with the inlet opening of said suction nozzle.

The invention further provides a suction nozzle for a fluid filter system cleanable by suction comprising a filter element fixedly attached to a substantially rigid filter-element support mounted in a filter housing, said suction nozzle having twin inlet openings and a slot cutting across its face between said twin inlet openings in a plane substantially perpendicular to the plane containing the axes of said inlet openings.

The invention will now be described in connection with certain preferred embodiments in the following examples so that it may be more fully understood. It is not, however, intended to limit the invention to these particular embodiments. On the contrary, it is intended that all alternatives, modifications and equivalents as may be included within the scope of the invention as defined by the appended claims be included herein. Thus, the following examples which include preferred embodiments will serve only to illustrate the practice of this invention, it being understood that the particular formulations described are by way of example and for purposes of illustrative discussion of preferred embodiments of the present invention only and are presented in the cause of providing what is believed to be the most useful and readily understood description of formulation procedures as well as of the principles and conceptual aspects of the invention.

DETAILED DESCRIPTION OF THE DRAWINGS

Figure 1:
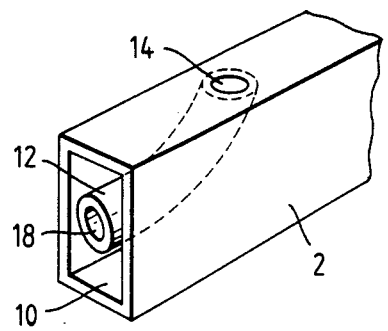
FIG. 1 is a partial, perspective view of the suction nozzle of a first embodiment of the filter system according to the present invention.
Figure 2:
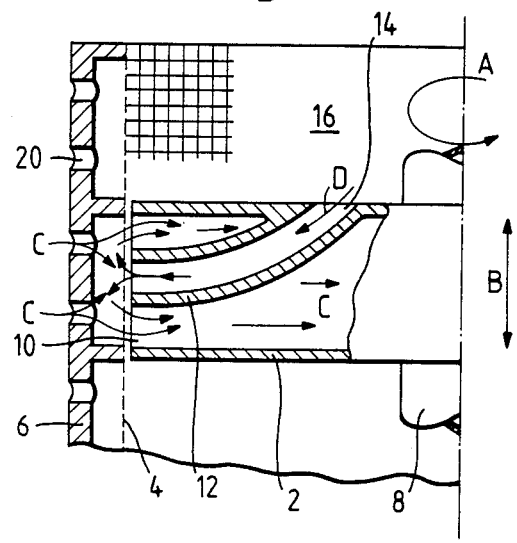
FIG. 2 is a partial, schematic, cross-sectional view of this first embodiment.

Referring now to the drawings, there is seen in FIGS. 1 and 2 a suction nozzle 2 arranged inside a filter element 4 mounted on a filter-element support 6, and capable of covering the entire filter element by being adapted, in a way as such known and needing no detailed explanation, to perform a rotary movement as indicated by arrow A, on which is superposed in this particular embodiment a reciprocating movement as indicated by arrows B. The suction effect in this and the other embodiments described is produced by opening the hollow nozzle shaft 8 to the atmosphere. This procedure, whether carried out manually or automatically as initiated by a pressure difference building up between filter inlet and outlet due to progressive clogging, is also well known and needs no further elaboration.

The length of the nozzle 2 (which may be one- or multi-armed) is such that its inlet opening 10 is in close proximity to the filter element 4. Seen is also a tubelike duct 12 located inside, and attached to a lateral wall of, the suction nozzle 2. This duct 12 extends slantingly between an inlet opening 14 co-planar with the above-mentioned lateral wall and communicating with the raw-water space 16 of the filter, and an outlet opening 18 co-planar with the inlet opening 10 of the suction nozzle 2.

When the suction nozzle 12 is activated, the suction flow, indicated by arrows C, produces a low-pressure region between its inlet opening 10 and that portion of the filter-element support which faces the nozzle 12. This low-pressure region causes a water stream from the raw-water space 16 to rush into the duct 12 in direction of arrow D, guided by the duct and emerging from the latter at the outlet opening 18 thereof. This stream impacts the filter element, interacts with the backflushing suction flow C drawn mostly through the holes 20 of the filter-element support 6 and is thereby instrumental in prying loose the filter deposits which are then sucked in through the suction nozzle 2.

Figure 3:
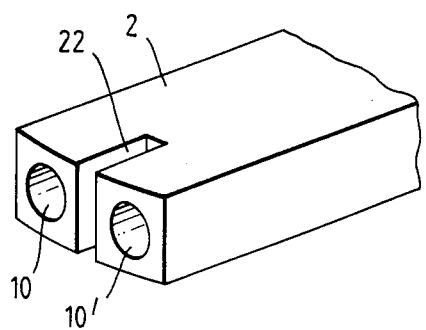
FIG. 3 is a partial, perspective view of the suction nozzle of a second embodiment of the filter system of the present invention.
Figure 4:
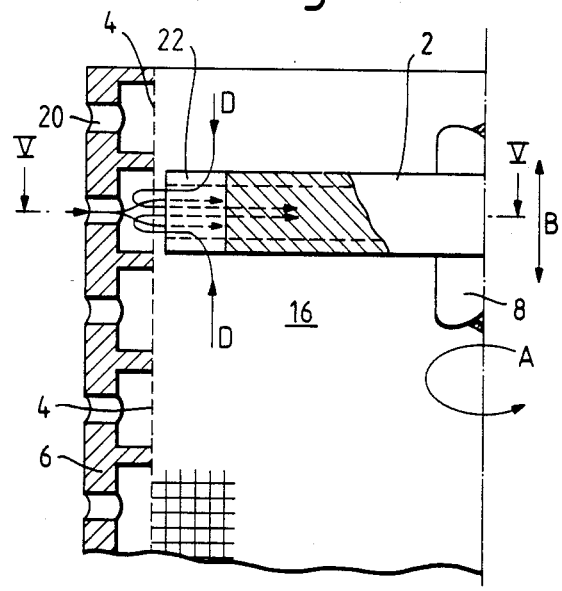
FIG. 4 is a partial, schematic, cross-sectional view of this second embodiment.
Figure 5:
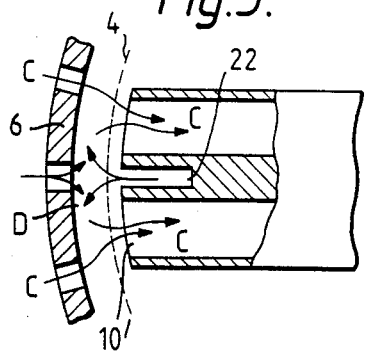
FIG. 5 is a partial view, in cross section along plane V—V, of the embodiment of FIG. 4.
Figure 6:
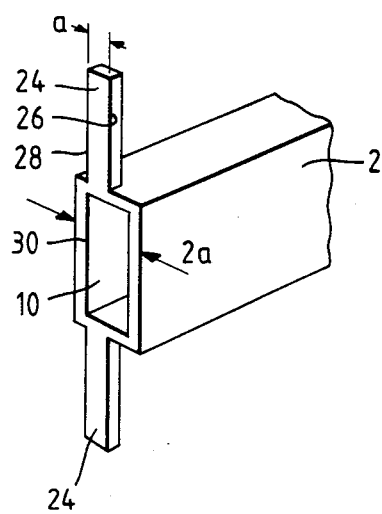
FIG. 6 shows a partial, perspective view of the suction nozzle of a third embodiment of the present invention.

Another embodiment of the system according to the invention is illustrated in FIGS. 3 to 5. In this embodiment, which otherwise functions analogously to the embodiment of FIGS. 1 and 2, the suction nozzle 2 is a twin nozzle, having two inlet openings 10, 10'. The latter may separately lead into the hollow shaft 8 or may unite after some length to form a single duct draining into the shaft 8. The tubular duct 12 of the previous embodiment is replaced by a slot 22 provided between the inlet openings 10, 10'. This slot 22, as can be seen in FIGS. 4 and 5, opens laterally into the raw-water space 16, and frontally into the above-mentioned low-pressure region. The directions taken by the suction flow C and the suction-induced water stream D are clearly indicated by the respective arrows.

Yet another embodiment of the system according to the invention is shown in FIGS. 6 to 9.

The nozzle 2 of this embodiment has an inlet opening 10 of a width 2a and is provided with two wing-like projections 24 of a width a. It should be noted that the projections 24 are not centered with respect to the width 2a of the inlet opening 10, but are offset to such a degree that their edge 26 is aligned with the center line of the inlet opening 10, while their other edge 28 is aligned with the edge 30 of the inlet opening 10. The purpose of these wings 24 and of their offset position will be explained further below.

Figure 7:
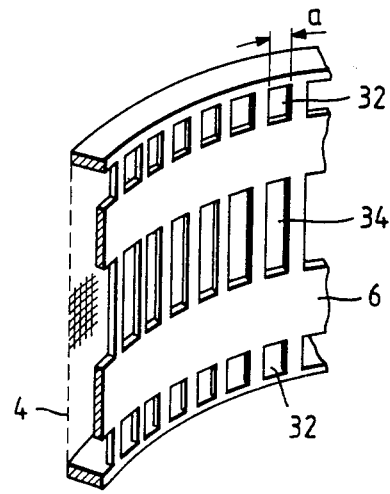
FIG. 7 is a partial, perspective view of the filter-element support of the third embodiment.
Figure 8:
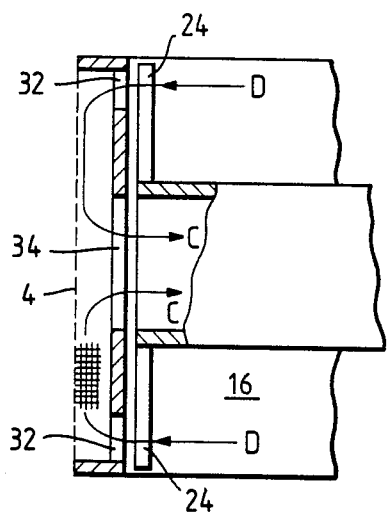
FIG. 8 is a partial, schematic view, in cross section, of the nozzle of FIG. 6 in a first position relative to the filter-element support of FIG. 7.
Figure 9:
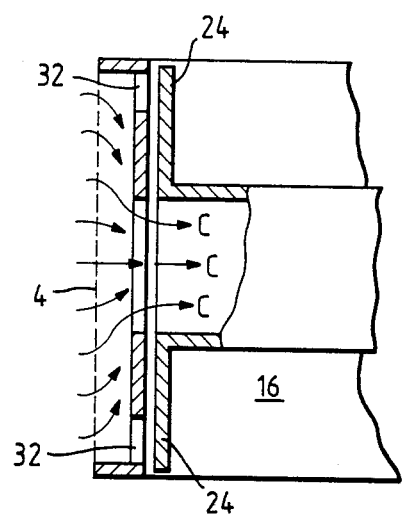
FIG. 9 is a similar view, showing the nozzle of FIG. 6 in a second position relative to the filter-element support of FIG. 7.

FIG. 7 shows a section of the filter-element support 6 of this embodiment. It is seen that, in contradistinction to the previous embodiments, the filter element 2 is located at the outside, and not at the inside, of the filter-element support. Also, instead of the perforations 20 of the previous embodiments, there are provided two rows, upper and lower, of relatively low windows 32 and a central row of relatively high windows 34. The windows 32 and 34 are aligned in the axial direction of the cylindrical support 6 and are of a width a.

In operation, the arrangement works as follows: As the nozzle 2, in its rotational movement, sweeps along the rows of windows 32, 34, each window 34 "registers", in succession, with the inlet opening 10 and, at that instant, is exposed to the suction effect of the nozzle which produces the above-mentioned low-pressure region in the immediate vicinity of window 34. The windows 32, on the other hand, are alternatingly obturated and exposed to the relatively high pressure of the raw-water space 16 by the wing-like projections 24 of the nozzle 2. Thus in the position shown in FIG. 8, the window 34, being of a width a, is already fully exposed to the first half of the 2a-wide inlet opening 10, while the upper and lower windows 32 are not yet obturated by the projection 24 which, as will be remembered, are offset and of a width a only. At this stage, windows 32 thus constitute a connection between the high-pressure raw-water space 16 and the above-mentioned low-pressure region, as a result of which a water stream D is induced to rush through the windows 32 towards the low-pressure region, impacting, and sweeping along, the filter element 4 before being drawn into the suction nozzle 2. At the next instant, however, (FIG. 9), with the continued rotation of the nozzle 2, the projections 24 obturate the windows 32, while the 2a-wide inlet opening still registers with the window 34 and produces the full backflushing effect indicated in FIG. 9, the suction flow c drawing in the filter deposits loosened in the stage shown in FIG. 8. The stages represented, respectively, in FIGS. 8 and 9 of course alternate with the rotation of the nozzle. In this embodiment, the suction-induced water stream D is thus of a pulsating nature, which greatly adds to its effectiveness.

The nozzle in this particular embodiment performs a rotary movement only. To obtain taller filters, it is, however, possible to mount two or more of these nozzles on top of one another.

While the cross sections of the nozzles 2 shown are all rectangular, this need not necessarily be the case. The nozzle of FIG. 1, for instance could also be square, round, or elliptical. The same is the case with the nozzle of FIG. 6. Here, however, it should be remembered that the configuration of the windows 34 should be roughly identical with that of the nozzle cross section.

It will also be appreciated that the reciprocating movement of the nozzles of FIGS. 1 and 3 could be dispensed with by providing several such nozzles arranged on top of each other so that, together, they would cover the entire height of the filter element 4.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A fluid filter system cleanable by suction, comprising a filter element rigidly attached to a substantially rigid filter-element support mounted in a filter housing and provided with a plurality of openings, at least one suction nozzle having an inlet opening located in close proximity to said filter element and adapted to move with its inlet opening past said filter element in such a way as to cover, in succession, at least some zones of said filter element while producing a suction flow, further comprising guide means for guiding, in a direction at least partially substantially opposite to the general direction of said suction flow, a fluid stream from the high-pressure raw-fluid space of said filter housing to a low-pressure zone created by said suction nozzle between the inlet opening thereof and that portion of the filter-element support which faces said suction nozzle.

2. The filter system as claimed in claim 1, wherein said guide means is at least one tube-like duct located inside, and attached to a lateral wall of, said suction nozzle, and extending between an inlet opening co-planar with said lateral wall and communicating with the raw-fluid space of said filter housing, and an outlet opening substantially co-planar with the inlet opening of said suction nozzle and communicating with said low-pressure region.

3. The filter system as claimed in claim 1, wherein said suction nozzle is a twin nozzle, and said guide means is a slot provided between the inlet openings of said twin nozzle and opening laterally into the raw-fluid space of said filter housing, and frontally into said low-pressure region.

4. The filter system as claimed in claim 1, wherein said guide means is a plurality of window-like openings in said filter-element support, each of said openings constituting a connection between the raw-fluid space of said filter housing and said low-pressure region, each of said window-like openings being in succession obturated by a wing-like projection integral with said moving suction nozzle, whereupon said connection is momentarily interrupted, and re-exposed to said raw-fluid space, whereupon said connection is reestablished.

5. A suction nozzle for a fluid filter system cleanable by suction comprising a filter element fixedly attached to a substantially rigid filter-element support mounted in a filter housing, said suction nozzle having an inlet opening and a tube-like duct located at the inside of said nozzle, and attached to a lateral wall thereof, said duct extending between an inlet opening co-planar with said lateral wall, and an outlet opening substantially co-planar with the inlet opening of said suction nozzle.

6. A suction nozzle for a fluid filter system cleanable by suction comprising a filter-element fixedly attached to a substantially rigid filter-element support mounted in a filter housing, said suction nozzle having twin inlet openings and a slot cutting across its face between said twin inlet openings in a plane substantially perpendicular to the plane containing the axes of said inlet openings.

7. A fluid filter system cleanable by suction, comprising a filter element fixedly attached to a substantially rigid filter-element support mounted in a filter housing and provided with a plurality of openings, at least one suction nozzle having an inlet opening located in close proximity to said filter element and adapted to move with its inlet opening past said filter element in such a way as to cover, in succession, at least some zones of said filter-element while producing a suction flow, further comprising guide means for guiding a fluid stream from the high-pressure raw-fluid space of said filter housing to a low-pressure zone created by said suction nozzle between the inlet opening thereof and that portion of the filter-element support which faces said suction nozzle, wherein said guide means comprises at least one tube-like duct located inside, and attached to a lateral wall of, said suction nozzle, and extending between an inlet opening co-planar with said lateral wall and communicating with the raw-fluid space of said filter housing, and an outlet opening substantially co-planar with the inlet opening of said suction nozzle and communicating with said low-pressure pressure region.

8. A fluid filter system cleanable by suction, comprising a filter element fixedly attached to a substantially rigid filter-element support mounted in a filter housing and provided with a plurality of openings, at least one suction nozzle having an inlet opening located in close proximity to said filter element and adapted to move with its inlet opening past said filter element in such a way as to cover, in succession, at least some zones of said filter-element while producing a suction flow, further comprising guide means for guiding a fluid stream from the high-pressure raw-fluid space of said filter housing to a low-pressure zone created by said suction nozzle between the inlet opening thereof and that portion of the filter-element support which faces said suction nozzle, wherein said suction nozzle is a twin nozzle, and said guide means comprises a slot provided between the inlet openings of said twin nozzle and opening laterally into the raw-fluid space of said filter housing, and forwardly into said low-pressure region.

9. A fluid filter system cleanable by suction, comprising a filter element fixedly attached to a substantially rigid filter-element support mounted in a filter housing and provided with a plurality of openings, at least one suction nozzle having an inlet opening located in close proximity to said filter element and adapted to move with its inlet opening past said filter element in such a way as to cover, in succession, at least some zones of said filter-element while producing a suction flow, further comprising guide means for guiding a fluid stream from the high-pressure raw-fluid space of said filter housing to a low-pressure zone created by said suction nozzle between the inlet opening thereof and that portion of the filter-element support which faces said suction nozzle, wherein said guide means comprises a plurality of window-like openings in said filter-element support, each of said openings comprising a connection between the raw-fluid space of said filter housing and said low-pressure region, each of said window-like openings being successively obturated by a wing-like projection integral with said moving suction nozzle, wherein said connection is momentarily interrupted and re-exposed to said raw-fluid space in order to reestablish said connection.

* * * * *